United States Patent
Hitchcock et al.

(10) Patent No.: US 8,074,264 B2
(45) Date of Patent: Dec. 6, 2011

(54) SECURE KEY DISTRIBUTION TO INTERNET CLIENTS

(75) Inventors: Daniel W. Hitchcock, Bothell, WA (US); Siddharth Bhai, Redmond, WA (US); Nathan D. Muggli, Kirkland, WA (US); Brian W. Puhl, Redmond, WA (US); Lee F. Walker, Christiansburg, VA (US)

(73) Assignee: Microsoft Corporation, Redmond, WA (US)

( * ) Notice: Subject to any disclaimer, the term of this patent is extended or adjusted under 35 U.S.C. 154(b) by 866 days.

(21) Appl. No.: 12/104,425

(22) Filed: Apr. 16, 2008

(65) Prior Publication Data

US 2009/0265772 A1    Oct. 22, 2009

(51) Int. Cl.
*H04L 9/32* (2006.01)
*H04L 9/00* (2006.01)
*G06F 17/30* (2006.01)

(52) U.S. Cl. ............ 726/7; 726/3; 726/4; 726/5; 726/6; 713/155; 713/156; 713/157; 713/158

(58) Field of Classification Search ............ 713/10; 726/7
See application file for complete search history.

(56) References Cited

U.S. PATENT DOCUMENTS

| | | | |
|---|---|---|---|
| 7,181,620 B1 * | 2/2007 | Hur | 713/171 |
| 2003/0212887 A1 * | 11/2003 | Walther et al. | 713/151 |
| 2009/0113537 A1 * | 4/2009 | Woo | 726/12 |

* cited by examiner

*Primary Examiner* — Longbit Chai
(74) *Attorney, Agent, or Firm* — Russell S. Krajec; Krajec Patent Offices, LLC

(57) ABSTRACT

A server may bridge between a wide area network, such as the Internet, and a local area network and may process authentication requests from clients on the wide area network. The server may filter the requests to enable specific types of requests to pass, and may forward the requests to a credential server within the local area network and pass any responses back to the client. The server may be configured with some or all of a set of domain services objects, but such objects may be stored in a read only format. The server may further contain a minimum of or no sensitive data such that, if compromised, an attacker may gain little advantage. The client may request evidence of authentication available to devices within the local area network and may use the evidence of authentication to access services made available to the wide area network.

20 Claims, 4 Drawing Sheets

US 8,074,264 B2

SECURE KEY DISTRIBUTION TO INTERNET CLIENTS

BACKGROUND

Kerberos is an authentication and security mechanism that may allow devices and individuals communicating over a non-secure network to prove their identity to one another in a secure manner. Kerberos and other such authentication systems may protect against eavesdropping and replay attacks on the communication system. An eavesdropping attack may be where an intruder may monitor a communication to obtain data in the communication. A replay attack may be where an intruder monitors an authentication session, such as when a password or other credential is transmitted, and the intruder may replicate the credential posing as the original sender to gain access to the authentication service.

Kerberos is only one of many different types of authentication and security mechanisms. Kerberos is based on a Needham-Schroeder protocol and is an example of a system that may use a symmetric encryption algorithm. Other authentication and security systems may implement the Needham-Schroeder protocol or some other symmetric encryption algorithm. Other systems may also use a Needham-Schroeder Public-Key Protocol or some other protocol.

SUMMARY

A server may be deployed between a wide area network, such as the Internet, and a local area network, and may process authentication requests from clients on the wide area network. The server may filter the requests to enable specific types of requests to pass, and may forward the requests to a credential server within the local area network and pass any responses back to the client. The server may be configured with some or all of a set of domain services objects, but such objects may be stored in a read only format. The server may further contain a minimum of or no sensitive data such that, if compromised, an attacker may gain little advantage. The client may request validation of evidence of authentication from devices within the local area network, and may use evidence of this validation to access services made available to the wide area network.evidence of authentication evidence of authentication This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
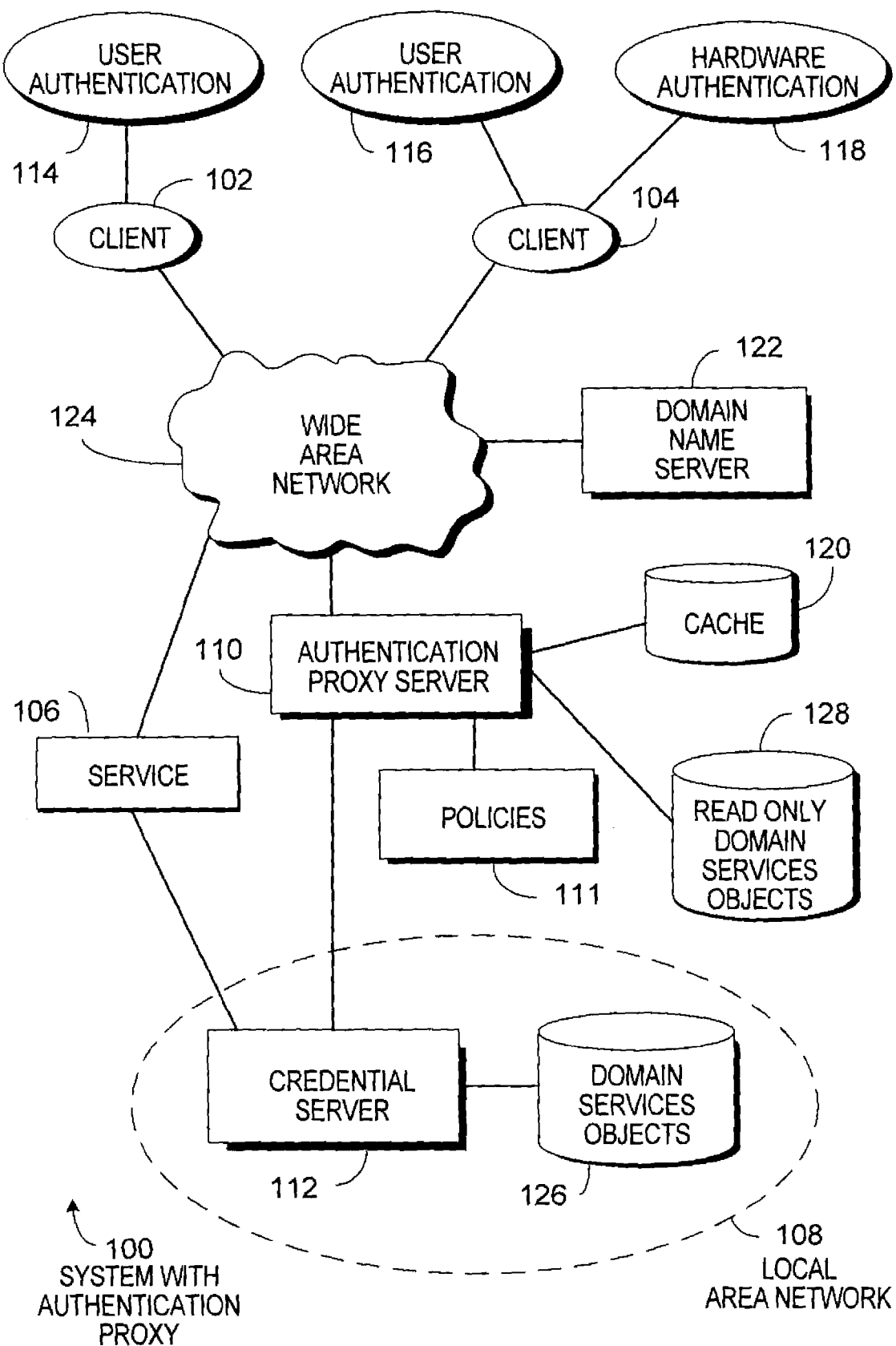
FIG. 1 is a diagram illustration of an embodiment showing a system with an authentication proxy.

A server may provide a gateway between the Internet and a local area network and enable a client outside the network to authenticate with a credential server inside the local area network. The client may receive a evidence of authentication proof of authentication to access services that are made available to the Internet.

The server may process authentication requests evidence of authentication and may restrict the requests to specific types of authentication. For example, a smart card or some other hardware authentication may be used separately or in addition to a user, service, device, or other digital subject authentication. The server may honor requests for one type of request but not another.

The evidence of authentication may be part of a Kerberos or other authentication protocol. Kerberos is an example of a system that may use symmetric key cryptography with a trusted third party. Many different symmetric key algorithms may be used, including Twofish, Serpent, AES (aka Rijndael), Blowfish, CAST5, RC4, DES/3DES, IDEA, and others. In some cases, an authentication system may use public key cryptography or asymmetric cryptography system.

In this specification, examples of a Kerberos authentication protocol may be used to highlight various functions and capabilities. When such examples are given, the concepts are not meant limit but to illustrate and enable one skilled in the art to practice the concepts with various authentication protocols.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with an authentication proxy server. Embodiment 100 is an example of a system that may provide evidence of authentication to clients outside a local area network. The evidence of authentication may be recognized by services originating from the local area network and made available outside the network. An authentication proxy server may filter specific types of credential requests based on specific policies.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Client access to various services across an open wide area network such as the Internet may pose various security risks. Malicious attackers may attempt to eavesdrop to obtain access evidence of authentication to enter a local area network. In many networks, gateway devices, proxies, firewalls, and many other devices and techniques may be used to limit access from outside a controlled network such as a local area network.

In many such techniques for limiting access, access may be granted to specific types of requests. For example, a limited set of ports may be enabled in a firewall to allow certain communications to pass. In another example, communications with specific evidence of authentication may be permitted.

A credential or authentication system may use various techniques for identifying and authenticating a user, device, service, or other authenticated entity. One such mechanism is Kerberos. Kerberos is an example of a system that may use symmetric key cryptography with a trusted third party. In a trusted third party system, a client may authenticate itself to the trusted third party and receive evidence of authentication that may be used to authenticate the client to a service. The service may recognize and accept the evidence of authentication as being authentic.

Embodiment 100 is an example of a system that may enable clients 102 and 104 to obtain access to a service 106. The clients 102 and 104 may connect to a local area network 108 through an authentication proxy server 110 to receive evidence of authentication evidence of authentication through a credential server 112. The evidence of authentication may be presented to and accepted by the service 106.

The authentication proxy server 110 may serve as a communications link between the wide area network 124 and the local area network 108. Communications directed to the credential server 112 may pass through the authentication proxy server 110. In some embodiments, the authentication proxy server 110 may filter credential requests. The authentication proxy server 110 may be exposed to the wide area network 124 in a manner such that if compromised, the authentication proxy server 110 may not enable further access to the local area network 108.

When filtering a credential request, the authentication proxy server 110 may enable requests with specific types of authentication to pass through while ignoring or rejecting other types of requests. For example, an administrator for a company's local area network 108 may issue smart cards or some other hardware identifier to employees. A smart card may be used as a hardware authentication 118 for a client 104 along with a user name and password as a user authentication 116. The authentication proxy server 110 may allow credential requests hardware authentication 118 from client 104, but may disallow a credential request from client 102 with only a user authentication 114, for example.

By using both hardware and user authentication, a client device may have two levels or mechanisms for authenticating itself. Many hardware authentication mechanisms, such as smart cards, may have a built in cryptographic processor, public/private encryption key system, or some other mechanism for secure authentication.

A typical Kerberos communication session performed using embodiment 100 is given below, however, such a discussion is for example purposes only. Many other authentication systems may be used with the systems and functions described in embodiment 100, including various symmetric key cryptography systems, public key cryptography systems, and other authentication systems. The Kerberos example is merely used to highlight certain functions that may be applied to many different authentication systems.

In a general Kerberos implementation, a client may authenticate to an authentication server using a long-term shared secret and may receive a ticket from the authentication server. Later, the client may use this ticket to get additional tickets to access services without resorting to using the shared secret. These tickets can be used to prove authentication to a service.

A client 102 may enter a username and password on the client to generate a user authentication 116. A user authentication 116 may also be generated by a fingerprint reader or other biometric reader.

In some cases, a hardware authentication mechanism 118 may be used. Hardware authentication mechanisms may be passive, such as a Media Access Control (MAC) address, a serial number, or some other device identifier. In some cases, a hardware authentication mechanism may be an active mechanism that may be encrypt or decrypt communications, may use various encryption technologies, or have elaborate authentication mechanisms. An example of such a mechanism may be a PKINIT Kerberos request.

The client 104 may perform a one-way encryption function on the user authentication and/or hardware authentication mechanism to create a secret key for the client 104. In some cases, a hardware based authentication mechanism may be used.

The client 104 may use a domain name server 122 to determine an address for the authentication proxy server 110 and establish a connection. The client 104 may transmit a request for services using a cleartext message. The cleartext message may identify the user, but may not include the secret key, password, or other secret information.

The authentication proxy server 110 may analyze the incoming request against a set of policies 111. The policies may define which user is permitted access and what type of authentication is permitted for the user. In many cases, a specific type of request may be permitted. For example, a PKINIT command may be used by some Kerberos implementations to establish evidence of authentication using a smart card technology. Such a request may be a Kerberos ticket granting ticket request.

The authentication proxy server 110 may pass the request into the local area network 108 to a credential server 112. The credential server 112 may check to see if the client 104 is in a database of permitted users. If so, the credential server 112 may transmit a client/ticket granting server (TGS) session key encrypted using the secret key of the user, as well as a ticket granting ticket (TGT), which may include the client identification, client network address, ticket validity period, and the client/TGS session key. The TGT may be encrypted using the secret key of the service 106.

The credential server 112 may pass the client/ticket granting server session key and ticket granting ticket to the authentication proxy server 110, which may forward the information to the client 104. In some embodiments, the authentication proxy server 110 may store the session key and ticket granting ticket in a cache 120. The cache 120 may be used to service a subsequent request from client 104 without having to contact the credential server 112. In some embodiments, an authentication proxy server 110 may not have a cache 120.

Once the client 104 receives the client/TGS session key and ticket granting ticket, the client 104 may decrypt the client/TGS session key obtain the unencrypted client/TGS session key. This session key may be used for further communications with the credential server 112. At this point, the client 104 may authenticate itself to the service 106.

The client 104 may transmit two messages to the service 106: a message composed of the ticket granting ticket and the identification of the service 106, and a message with an authenticator composed of the identification of the client 104 and a timestamp encrypted using the client/TGS session key.

The service 106 may extract the ticket granting ticket from the first message and decrypt the client/TGS session key using the secret key belonging to the service 106. The service 106 may then decrypt the authenticator using the decrypted client/TGS session key.

The service 106 may then transmit a client-to-server ticket which may include the client identification, client network address, validity period, and client/server session key encrypted using the service's secret key. The service 106 may also transmit a client/server session key encrypted with the client/TGS session key.

The client may then have enough information to authenticate itself to the service 106. The client may then connect to the service 106 and sends the client-to-service ticket encrypted using the secret key of the service 106 and a new authenticator that may include the client identification and timestamp, and may be encrypted using client/server session key.

The service 106 may decrypt the ticket using its own secret key and may send the following message to the client 104 to confirm its true identity and willingness to serve the client 104: a timestamp found in client's recent authenticator plus 1, encrypted using the client/server session key.

The client 104 may decrypt the confirmation using the client/server session key and may check whether the timestamp is correctly updated. If so, then the client 104 can trust the service 106 and can start issuing service requests to the service 106.

In the Kerberos example, the authentication proxy server 110 may provide analysis and filtering of the initial cleartext request coming from a client 102 or 104. The authentication proxy server 110 may apply policies 111 that may permit or deny specific types of requests in specific circumstances. For example, some users may be permitted access without a hardware authentication while other users may be permitted access only with hardware authentication.

The authentication proxy server 110 may also serve as a gateway between a wide area network 124, such as the Internet, and a local area network 108. The gateway function may restrict access to those requests having the proper format, protocol, port, or other characteristics. Access requests that do not fully comply with the characteristics may be denied access.

In many embodiments, the authentication proxy server 110 may provide a read only copy of various domain services objects 128 that may be obtained from the domain services objects 126 provided by the credential server 112. The domain services objects 126 may be various descriptors of objects within with local area network. Examples of such objects may be users, servers, clients, devices, directories, and other objects on the local area network 108.

After a client 102 or 104 authenticates with the credential server 112, the authentication proxy server 110 may respond to requests from an authenticated client for information regarding various domain services objects. An example of such a request may be for an address of a server within the local area network 108, information about various users of the local area network 108, or other similar requests.

Figure 2:
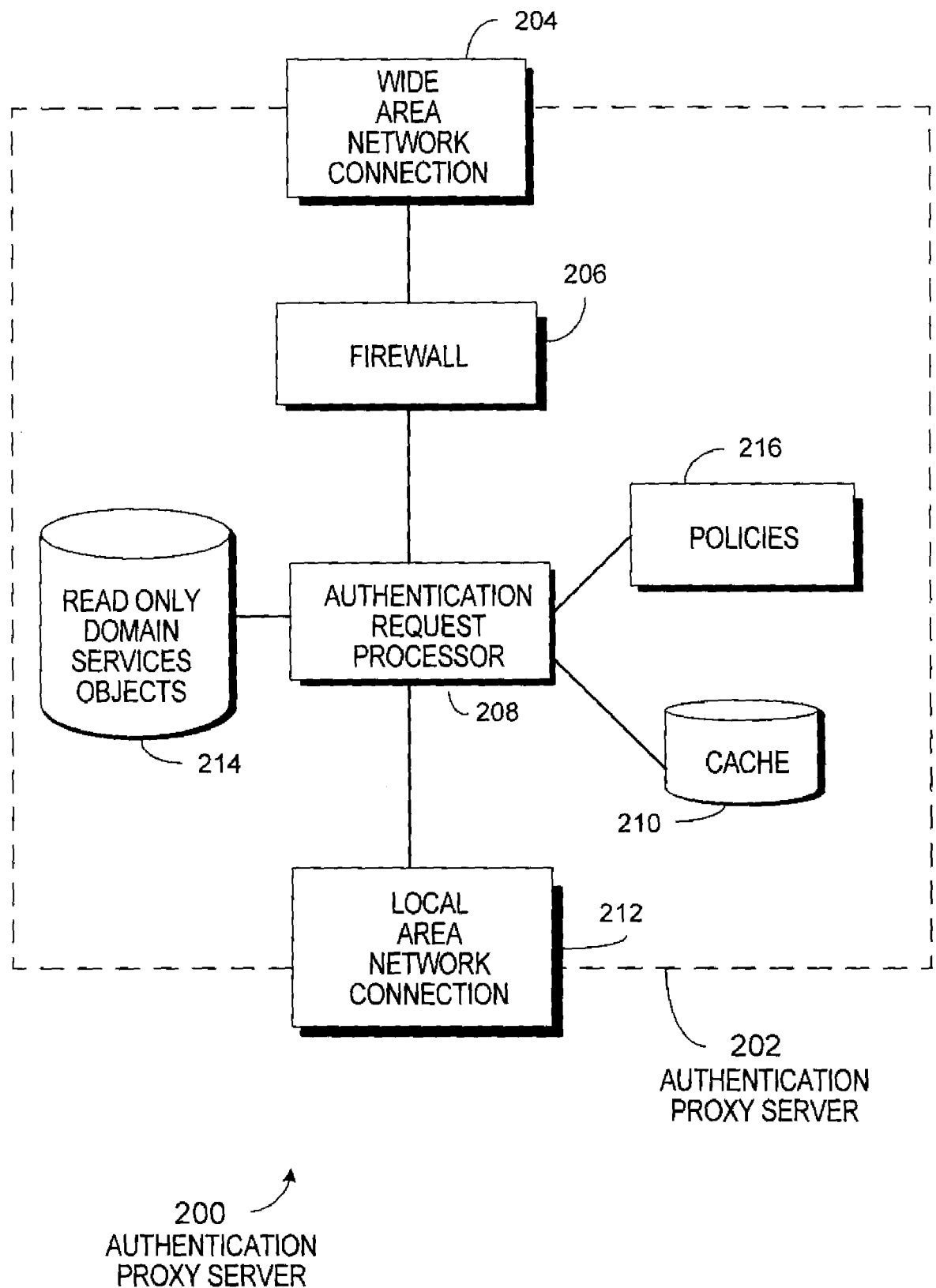
FIG. 2 is a diagram illustration of an embodiment showing the functional components of an authentication proxy.

FIG. 2 is a diagram illustration of an embodiment 200 showing an authentication proxy server 202. The authentication proxy server 202 may serve as a firewall as well as analyze incoming authorization requests and permit or deny those requests to be processed inside a local area network.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 is an example illustration of an authentication proxy server 202, which may perform a similar function as authentication proxy server 110 in embodiment 100. The authentication proxy server 202 may receive credential requests from clients, analyze the requests, and transfer proper requests across a local area network to a credential server. The authentication proxy server 202 may deny or ignore improper authentication or credential requests.

The authentication proxy 202 may have a wide area network connection 204. In some embodiments, the wide area network connection 204 may be a physical connection that receives input from a wide area network such as the Internet.

In other embodiments, the wide area network connection 204 may be a virtual or symbolic connection where incoming communications are routed across a portion of a local area network to the authentication proxy server 202. On example of such a connection may be when a network address translation device forwards incoming communications to the authentication proxy server 202.

Incoming data may be passed through a firewall 206. The firewall 206 may be a software or hardware device that filters communications based on format, content, addressing, or some other characteristic.

An authentication request processor 208 may receive authentication requests from clients connected to the wide area network connection 204 and determine if and how the request may be handled. When the authentication request processor 208 determines that a request is to be processed by a credential server inside the local area network, the request may be forwarded across the local area network connection 212.

The authentication request processor 208 may use a set of policies 216 to allow or deny certain requests. The policies 216 may determine which users or which devices are able to authenticate with a credential server, and the specific types of requests may be made by the users or devices. In some cases, the policies 216 may enable a specific combination of user and device to authenticate with a specific type of authentication request. Such request types may be different for each combination of user and device.

Figure 3:
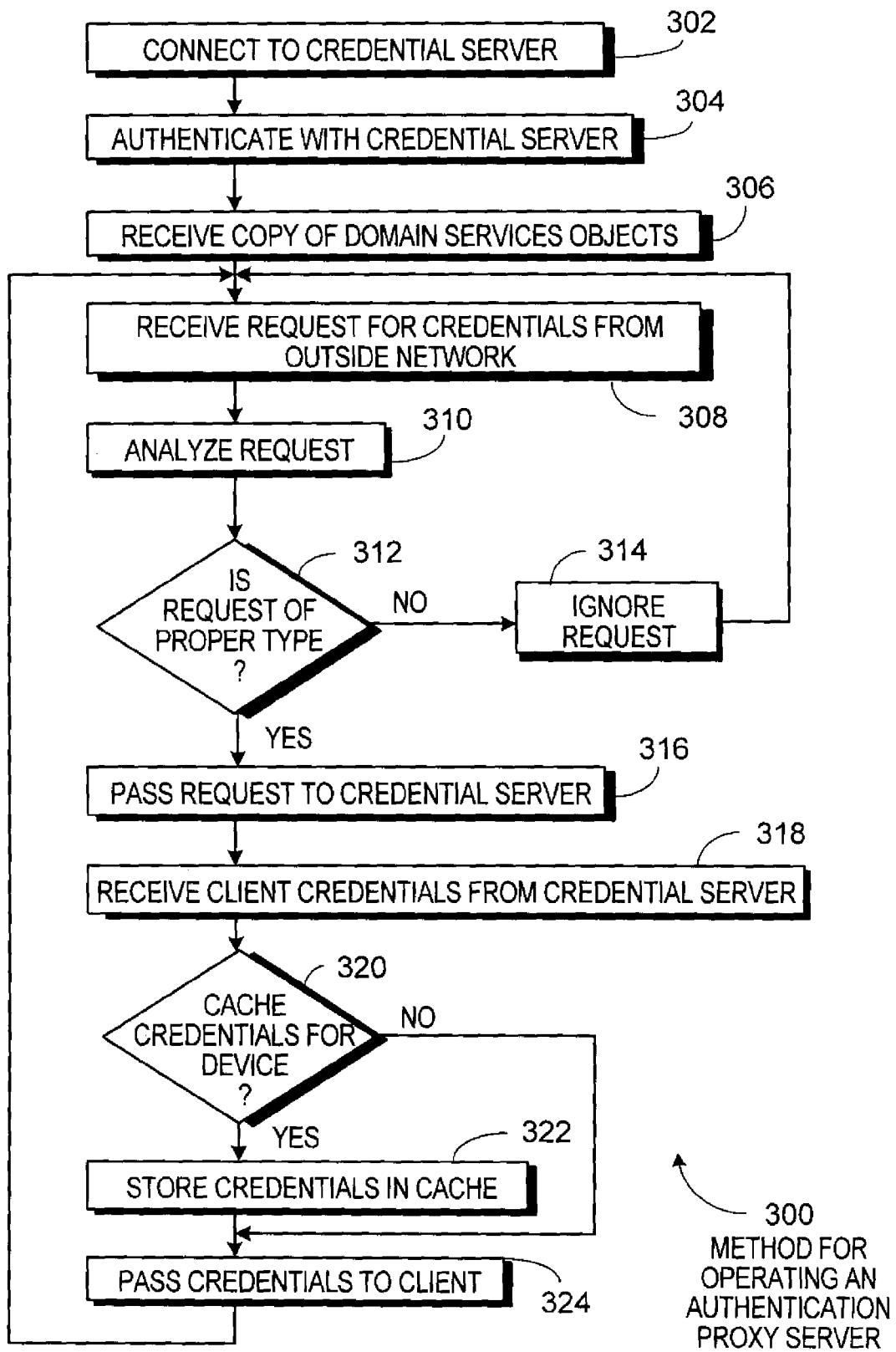
FIG. 3 is a flowchart illustration of an embodiment showing a method used by an authentication proxy server.

An example of a method performed by an authentication request processor 208 is illustrated in embodiment 300 described in FIG. 3.

In some embodiments, the authentication request processor 208 may store evidence of authentication issued by a credential server in a cache 210. The cache 210 may store evidence of authentication for a period of time, then remove the evidence of authentication. In some cases, evidence of authentication may be issued with an expiration time which may be a matter of seconds, minutes, hours, or even days. In such cases, the cache 210 may be configured to delete the evidence of authentication after the expiration time. In some cases, the cache 210 may be configured to remove evidence of authentication after the evidence of authentication have been stored for a predetermined time, regardless if the evidence of authentication have an expiration time.

The cache 210 may be used to store evidence of authentication for a subset of all users or devices that authenticate using the authentication proxy server 202. In some cases, the policies 216 may define which requests are cached and which are not. The policies may define users, groups of users, request types, devices, or device types or other characteristics of a request that may be cached, or the characteristics of those requests that may not be cached.

Some embodiments of an authentication proxy server 202 may include a read only copy of domain services objects 214. The read only copy of domain services objects 214 may enable the authentication proxy server 202 to respond to request for various network services inside a local area network. In many cases, user passwords and other evidence of authentication may not be stored in the read only domain services objects 214 because the authentication proxy server 202 may be exposed to the Internet or other wide area network.

FIG. 3 is a flowchart illustration of an embodiment 300 showing a method for operating an authentication proxy server. Embodiment 300 illustrates a method for setting up a read only copy of domain services objects, then processing requests for authentication and evidence of authentication from clients.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of a method that analyzes an incoming request and determines if the request is to be processed. The determination may be based on the type of request in some embodiments.

In block 302, a connection may be made to a credential server. Authentication may be made with the credential server in block 304, and a copy of domain services objects may be received in block 306.

Figure 4:
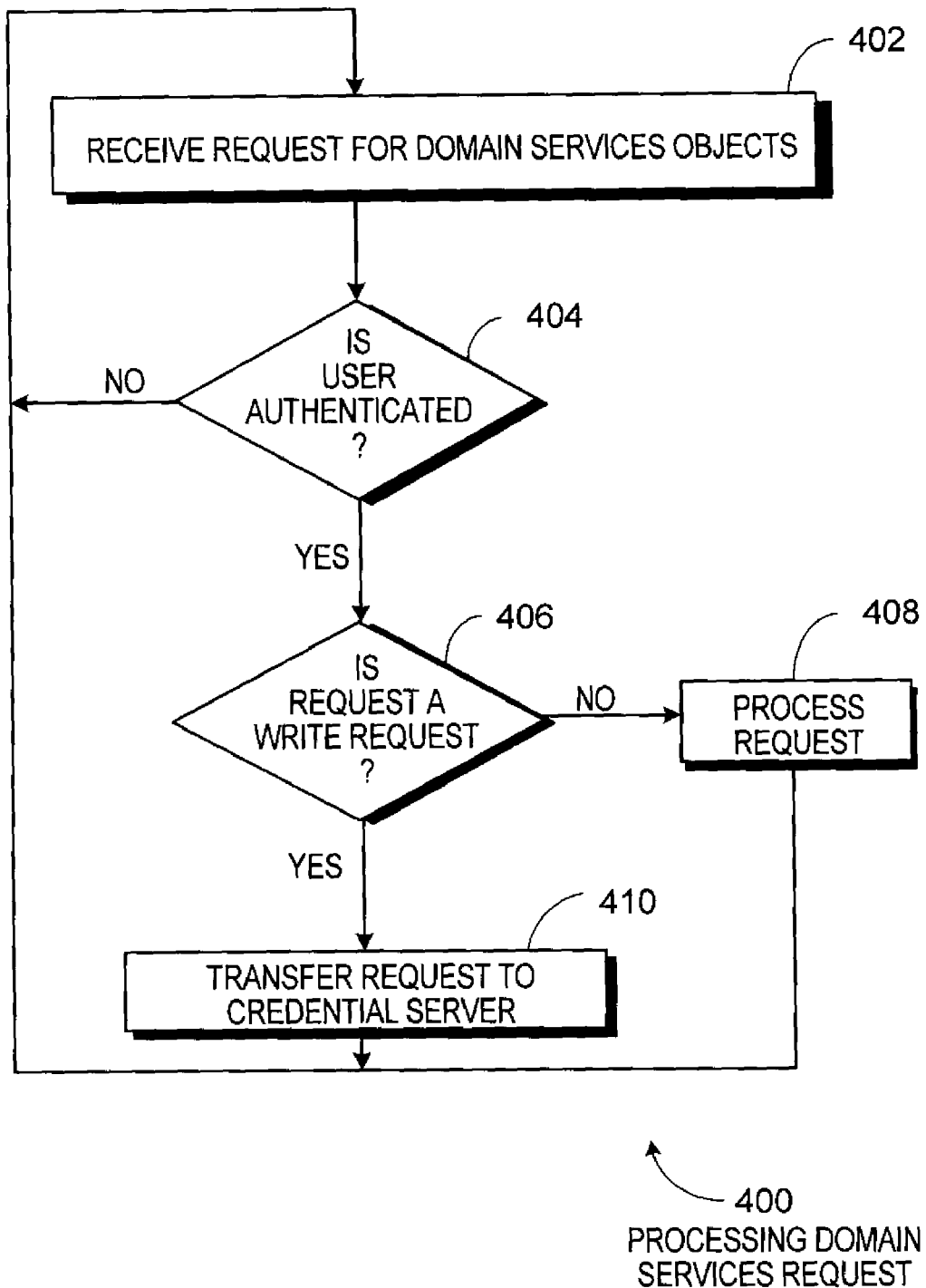
FIG. 4 is a flowchart illustration of an embodiment showing a method for responding to domain services queries by an authentication proxy server.

The domain services objects may be used to process read only requests, as described in embodiment 400 illustrated in FIG. 4.

A request for evidence of authentication may be received from a client on an outside network in block 308. The outside network may be a wide area network such as the Internet. The client may be any type of device capable of electronic communication, such as a server or personal computer, a handheld digital assistant, smart phone, laptop computer.

The request for evidence of authentication may be any transmission used to establish authenticated communications. In many cases, the transmission may be the initial communication in a series of communication transactions by which a client may be authenticated.

The client may request evidence of authentication that may enable the client to access an authentication proxy server or some other server or service. The evidence of authentication that are requested may be recognized and accepted by the service.

Many different authentication mechanisms may use a communication transaction to establish authentication between a client and a credential server. One example of such a system is Kerberos. Other authentication and credential systems may use symmetric key encryption, public/private key encryption, or other cryptographic protocols and algorithms to establish secure and trusted communications.

After receiving the request in block 308, the request may be analyzed in block 310. In some embodiments, the initial request in an authentication sequence may be analyzed, while in other embodiments, a second or later communication in an authentication sequence may be analyzed.

The analysis performed in block 310 may determine a type of request that is made. In many authentication and credential systems, evidence of authentication may be requested using different types of requests, with some requests having different levels of trust or assurances associated with the requests.

In the example of Kerberos, a general type of credential request may involve a user authentication, where a user name and password are the authentication mechanism. Other types of credential requests may use various forms of hardware authentication. Some forms of hardware authentication may be passive, such as using various identifiers associated with a specific piece of hardware, or may be active authentication using various encryption technologies, smart cards, or other mechanisms. An example of an active hardware authentication mechanism in Kerberos is PKINIT.

In a passive form of hardware authentication, the hardware device may contain a serial number, address, or code that is stored in the device and known to a credential server. In an active form of hardware authentication, the hardware device may have an encryption mechanism, cipher key, or any other mechanism that actively performs some function during an authentication process.

If the request is not the proper type in block 312, the request may be ignored in block 314.

If the request is the proper type in block 312, the request may be passed to a credential server in block 316, and a reply from the credential server may be received in block 318.

The determination of a proper type in block 312 may be performed by analyzing the request and comparing the request to a set of policies. The policies may define which types of requests are permitted or denied for certain combinations of users and devices. In some cases, all requests may be a specific type, such as PKINIT requests.

In some embodiments, an authentication request may be granted through a series of communications between a client and a credential server. Embodiment 300 illustrates a mechanism where one request may be used to generate a set of evidence of authentication. Other embodiments may use several steps of back and forth communication between the client and credential server before the evidence of authentication may be generated.

Embodiment 300 illustrates a method where the first request sent by a client device is analyzed. In other embodiments, the second or subsequent request may be analyzed to determine a type of credential request and the communication sequence may be aborted after analyzing a second or subsequent request.

When the evidence of authentication are generated by a credential server and passed to the authentication proxy server in block 318, the evidence of authentication may or may not be cached in block 320. If the evidence of authentication are to be cached in block 320, the evidence of authentication may be stored in a cache in block 322, otherwise block 322 may be skipped.

Evidence of authentication may be cached in block 320 for some evidence of authentication and not for others. In some embodiments, a set of policies may be used to define which evidence of authentication are cached and which are not. The policies may enable caching of a specific type of evidence of authentication, evidence of authentication form specific users or groups of users, from specific devices or groups of devices, or for any other definition.

When a set of evidence of authentication is cached, the cached evidence of authentication may be used to authenticate the same device or user a second time.

The evidence of authentication may be forwarded to the client in block 324.

FIG. 4 is a flowchart illustration of an embodiment 400 showing a method for processing domain services requests with a read only set of domain services objects. Embodiment 400 illustrates a method for receiving a request, determining if the request may be served with a read only set of domain services, and responding appropriately.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A request for domain services objects may be received in block 402. The request may be any type of request for domain services. For example, policies may be assigned, software deployed, and other administrative functions performed. In other examples, queries for resources, services and users may be processed. A resource may be a printer or other peripheral device available on a network. A service may be email, for example. Different embodiments may define various domain services objects in different manners and respond to certain requests using the domain services objects using various techniques and protocols.

If the user is not authenticated in block 404, the request may be ignored. If the user is authenticated in block 404, and the request is not a write request in block 406, the request may be processed in block 408. If the user is authenticated in block 404 and the request involves writing to the domain services objects in block 406, the request may be transferred to a credential server 410 that may have write access.

Embodiment 400 is an example of a method that may be used by an authentication proxy server to process domain services requests when the authentication proxy server has read only domain services objects available.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
connecting to at least one client device on a wide area network;
connecting to a credential server on a local area network;
receiving a copy of a set of domain services objects from said credential server;
making said copy of a set of domain services objects available to said wide area network;
receiving a first request for evidence of authentication from said client device, said request being received through said wide area network;
analyzing said first request to determine that said first request meets a predefined guideline;
transfer said first request to a credential server within said local area network;
receiving a set of evidence of authentication from said credential server; and
transferring said set of evidence of authentication to said client, said set of evidence of authentication being usable to establish an authenticated connection to a service of said set of domain services objects provided from within said local area network.

2. The method of claim 1, said wide area network comprising the Internet.

3. The method of claim 1, said predefined guideline comprising requests created with a hardware based credential.

4. The method of claim 1, said first request comprising a Kerberos Ticket Granting Ticket request.

5. The method of claim 1 further comprising:
receiving a second request from said client, said second request comprising a non-smart card authentication; and rejecting said second request.

6. The method of claim 1, said credential server comprising a set of domain services objects.

7. The method of claim 6 further comprising:
receiving a copy of said domain services objects.

8. The method of claim 7, said copy of said domain services objects being stored in a read only fashion.

9. The method of claim 1 further comprising:
caching said set of evidence of authentication as a set of cached evidence of authentication.

10. The method of claim 9, said cached evidence of authentication having an expiration time.

11. The method of claim 9 further comprising:
receiving a second request from said client device; and
responding to said second request using said cached evidence of authentication.

12. The method of claim 9 further comprising:
determining that credential caching is enabled for said client device.

13. A system comprising:
a connection to at least one client device on an Internet;
a connection to a credential server on local area network;
an authentication request processor configured to:
receive a copy of a set of domain services objects from said credential server;
make said copy of a set of domain services objects available to said internet;
receive a first request for evidence of authentication from client device, said request being received through said Internet;
analyze said first request to determine that said first request meets a predefined guideline;
transfer said first request to said credential server within said local area network;
receive a set of evidence of authentication from said credential server; and
transfer said set of evidence of authentication to said client, said set of evidence of authentication being usable to establish an authenticated connection to a service of said set of domain services objects provided from said local area network.

14. The system of claim 13, said predefined guidelines comprising requests made with a hardware based credential.

15. The system of claim 14, said hardware credential comprising a smart card.

16. The system of claim 13 further comprising a cache configured to store said set of evidence of authentication as a set of cached set of evidence of authentication.

17. The system of claim 13, said evidence of authentication being Kerberos evidence of authentication.

18. The system of claim 13 further comprising:
a read only set of domain services objects, said domain services objects being copied from said credential server.

19. A method comprising:
connecting to a credential server on a local area network;
receiving a copy of a set of domain services objects from said credential server;
making said copy of a set of domain services objects available to a wide area network;
receiving a first request for evidence of authentication from a client device, said request being received through said wide area network;
analyzing said first request to determine that said first request meets a predefined guideline;
transfer said first request to said credential server within said local area network;
receiving a set of evidence of authentication from said credential server; and
transferring said set of evidence of authentication to said client, said set of evidence of authentication being usable to establish an authenticated connection to a service of said set of domain services objects provided from said local area network.

20. The method of claim 19, said request comprising a Kerberos Ticket Granting Ticket request.

* * * * *